(12) United States Patent
King et al.

(10) Patent No.: US 7,208,181 B1
(45) Date of Patent: Apr. 24, 2007

(54) ISOLATION OF POLYPHENOLIC COMPOUNDS FROM FRUITS OR VEGETABLES UTILIZING SUB-CRITICAL WATER EXTRACTION

(75) Inventors: Jerry W. King, Peoria, IL (US); Richard D. Grabiel, Decatur, IL (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 545 days.

(21) Appl. No.: 10/171,258

(22) Filed: Jun. 12, 2002

(51) Int. Cl.
*A60N 65/00* (2006.01)
*A61F 2/00* (2006.01)
*A61F 13/02* (2006.01)

(52) U.S. Cl. .................. 424/725; 732/735; 732/750; 732/765; 732/776; 732/777; 732/779; 426/425; 426/431; 426/489

(58) Field of Classification Search .............. 424/725, 424/777, 735, 732, 736, 757, 765, 750, 776, 424/779; 426/425, 431, 489
See application file for complete search history.

(56) References Cited

U.S. PATENT DOCUMENTS

| | | | |
|---|---|---|---|
| 6,001,256 A | * | 12/1999 | Hawthorne et al. |
| 6,132,791 A | * | 10/2000 | Fox |
| 6,331,320 B1 | * | 12/2001 | Nakahara et al. |
| 6,403,126 B1 | * | 6/2002 | Webster et al. ............. 424/776 |
| 6,458,407 B1 | | 10/2002 | Miki et al. |
| 6,524,628 B1 | | 2/2003 | Wai et al. |
| 2002/0114853 A1 | | 8/2002 | Krasutsky et al. |

FOREIGN PATENT DOCUMENTS

| | | | |
|---|---|---|---|
| CH | 285548 B6 | * | 9/1999 |
| FR | 2260620 A | * | 10/1975 |

OTHER PUBLICATIONS

Wiley et al. Journal of Food Science (1979), 44(1): 208-212. Efficiency studies of a continuous diffusion apparatus for the recovery of betalaines from the red table beet.*

Ichiyanagi, T et al. Biological & Pharmaceutical Bulletin (Apr. 2000), 23(4): 492-497. Comparison of anthocyanin distribution in different blueberry sources by capillary zone electrophoresis.*

Jiminiez-Carmono, M. M. et al. Journal of Chromatography, A (1999). 855(2): 625-632. Comparison of continuous subcritical water extraction and hydrodistillation of leaves.*

Wennrich. L. et al., Chromatographia (2001), 53(Suppl.): S380-386. Determination of organochlorine pesticides and chlorobenzenes in fruit and vegetables using subcritcal water extraction combined with sorptive enrichment and CGC-MS.*

Alonso-Salces, R. M. et al. J o Chromatography A (2001), 933 (1-2): 37-43. Pressurized liquid extraction for the determination of polyphenols in apple.*

Rogelio Soto Ayala et al., Continuous Subcritical Water Extraction as a Useful Tool for Isolation of Edible Essential Oils, Food Chemistry 75 (2001) pp. 109-113.

A. Basile et al., Superheated Water Extraction of Essential Oils from Natural Products, Mar. 23-25, 1998, pp. 635-641, International Society for the Advancement of Supercritical Fluids.

Alena Kubátová et al., Comparison of Subcritical Water and Organic Solvents for Extracting Kava Lactones from Kava Root, Journal of Chromatography A, 923 (2001) pp. 187-194.

Alena Kubátová et al., Selective Extraction of Oxygenates from Savory and Peppermint using Subcritical Water, Flavour and Fragrance Journal 2001, 16: 64-73.

* cited by examiner

*Primary Examiner*—Michele Flood
(74) *Attorney, Agent, or Firm*—John D. Fado; Curtis P. Ribando; Lesley Shaw

(57) ABSTRACT

Anthocyanins, other flavonoids and related polyphenolic compounds are extracted from fruits or highly pigmented garden vegetables and their by-products using subcritical water with or without a secondary cosolvent. This method has the advantages of being relatively inexpensive, minimizes or totally avoids the use of objectionable solvents, and provides a facile means for supplying an ample source of concentrated phytochemicals for use in food formulation, dietary supplements and phyto-pharmaceutical applications.

19 Claims, 1 Drawing Sheet

ISOLATION OF POLYPHENOLIC COMPOUNDS FROM FRUITS OR VEGETABLES UTILIZING SUB-CRITICAL WATER EXTRACTION

BACKGROUND OF THE INVENTION

1. Field of the Invention

This invention relates to the use of sub-critical water extraction to remove polyphenolic compounds from fruits or highly pigmented garden vegetables and their by-products. The process treats whole fruits or vegetables and their by-products or related plant material with water at elevated temperatures and pressures below the critical point of water to extract the polyphenolic compounds for subsequent recovery.

Polyphenolic compounds are a category of phytonutrients known for having significant antioxidant effects. Structurally, these compounds all have an aromatic or phenolic ring and may impart color to fruits and vegetables. Of the numerous classes of polyphenols, the flavonoids are perhaps the most nutritionally important. The flavonoids are secondary plant metabolites that consist of two aromatic rings connected by a three-carbon bridge. The flavonoids include, for example: the isoflavones found in soybeans; tannins (polymers of proanthocyanidins) found in tea and nuts; quercetin found in grapes, lignins found in grains and nuts; and the anthocyanins found in fruits, vegetables and berries.

The anthocyanins are responsible for the bright reds, blues and purples in berries and certain fruits and vegetables. These compounds are active in the visible and UV range, permitting visibility to insects and functioning as sun screen agents to plant tissue. The positive human health effects of anthocyanins have been documented, including improving microcirculation and strengthening blood vessels, fighting viruses, improving night vision and having antioxidant, anti-inflammatory, and anticarcinogenic actions within the body. Thus, there is a substantial market in the United States and other countries for these compounds.

2. Description of the Prior Art

The isolation of polyphenolic mixtures can be expensive, generally requiring a vast quantity of raw materials for the production of a relatively small amount of active compound. Anthocyanin contents in chokeberries are found at levels from 3.1–6.3 mg/g (fresh wt.) with levels varying for different varieties and geographical locations [Plocharski, *Fruit Processing*, 2(6):85–89 (1992)]. Blueberry varieties have been reported to have highly variable levels of anthocyanins ranging from 0.83–3.7 mg/g (fresh wt.) [Kalt et al., *Can. J. Plant Sci.*, 79:617–623 (1999)]. Ellagic Acid levels in different varieties of strawberries range from 0.43–4.64 mg/g (dry wt.)[Maas et al., *Hort. Sci.*, 26(1):66–68 (1991)]. Other components such as procyanidins and flavanols are found in similarly low levels in fruits depending on growing conditions and cultivars [Rommel et al., *J. Agric. Food Chem.*, 41:1237–1241 (1993); Prior et al., *J. Agri. Food Chem.*, 49:1270–1276 (2001)]. Much of the fruit (whole or partial) harvested in the United States is used for juice processing. However, juices are not the only readily-available sources of polyphenolic compounds. These compounds can also be found in the pomace (spent skins, stems and seeds) remaining after the juicing operation.

The isolation of polyphenolic compounds for the nutraceutical market has been limited to the use of extraction solvents approved for food-grade use such as ethanol and acetone in the United States, and ethyl acetate and methylene chloride in Europe. Even though approved for use in the food industry, these solvents are perceived to varying degrees, as being unsafe and environmentally harmful. Moreover, they are also relatively expensive in comparison with the value of the waste stream obtained from juicing operations. Many fruit and juice processors discard the pomace and thus a potentially valuable source of phytochemical compounds.

Recently, subcritical water extraction (SWE) has been presented as an alternative to organic solvents for isolating valuable components from plant material. For example, kava lactones have been successfully removed from kava root utilizing SWE extraction, and have been found to compare favorably to extractions performed with acetone, methylene chloride or methanol [Kubatova et al., *J. Chrom. A.*, 923: 187–194 (2001)]. SWE has also been utilized to obtain extracts from rosemary [Basile et al.; *J. of Food and Agric. Chem.*, 46:5202–5209 (1998)], savory and peppermint [Kubatova et al; *J. Chrom. A.* 923:187–194 (2001)] and marjoram [Jimenez-Carmona, *J. Chrom.* 855:625 (1999)].

SUMMARY OF THE INVENTION

We have now discovered that SWE can be effectively applied to the isolation of anthocyanin-based pigments (anthocyanins) and other polyphenolic compounds from fruits or highly pigmented garden vegetables and their processing by-products.

In accordance with this discovery, it is an object of this invention to provide an extraction/fractionation process that will enrich anthocyanins and/or similar polyphenolics in the resultant extract.

A further object of the invention is to provide an inexpensive method for isolating polyphenolic compounds from fruits or vegetables under relatively low temperature and pressure processing conditions and without the use of explosive or flammable solvents, or solvents that are subject to strict exposure or emission limits.

It is also an object of the invention to provide a means for supplying an ample source of concentrated phytochemicals for use in food formulation, dietary supplements and phytopharmaceutical applications.

Yet another object of the invention is to provide an improved method for isolating anthocyanins and other phytochemicals that requires minimal extraction time without the requirement for explosion-proof or flammable-safe equipment.

Other objects and advantages of this invention will become readily apparent from the ensuing description.

DETAILED DESCRIPTION

Figure 1:
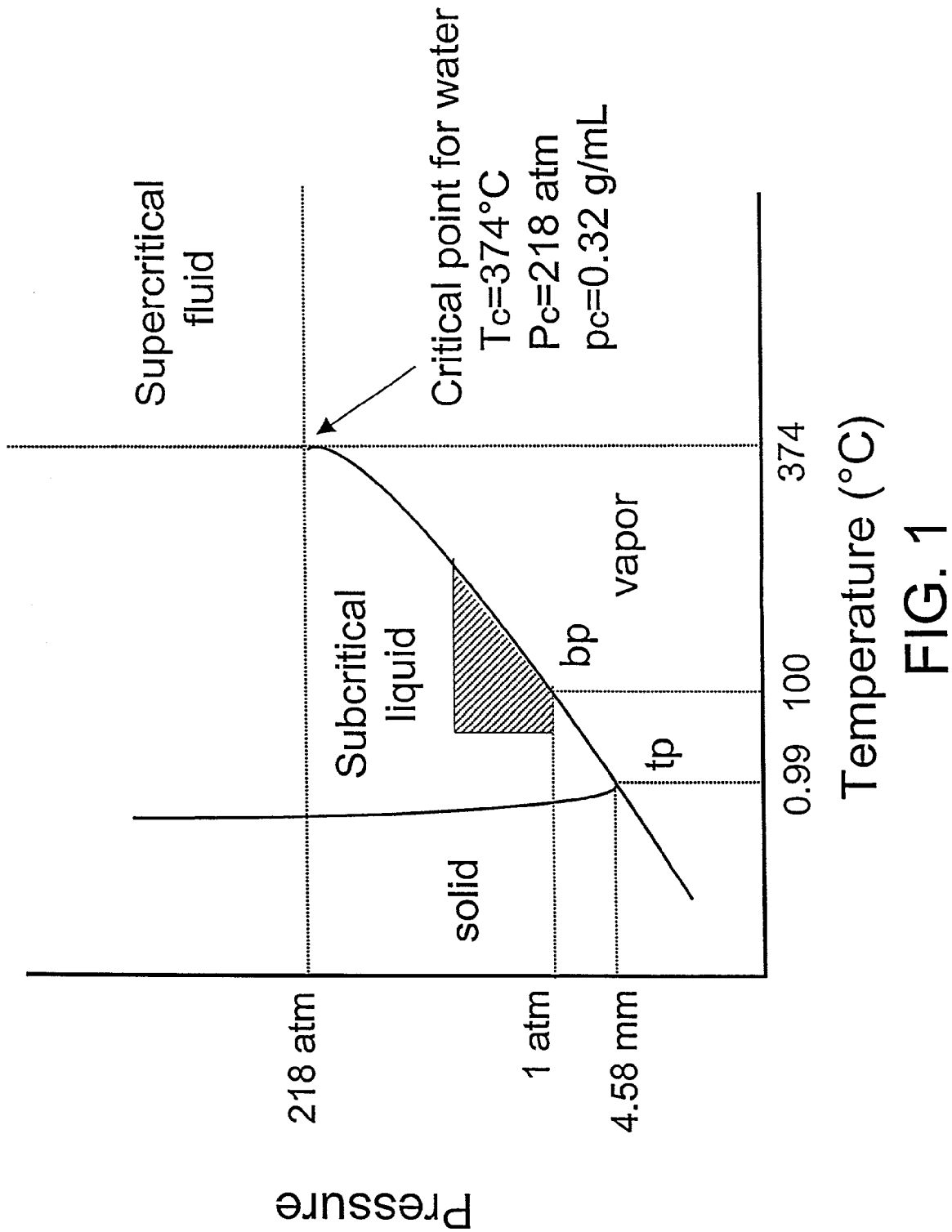
FIG. 1 is a phase diagram for water as a function of temperature and pressure, where the cross-hatched area indicates the preferred region for carrying out the invention with water in the subcritical liquid state.

Source materials for use in this invention include any polyphenolic compound-containing fruit or vegetable material, including: whole (intact) or partial fruits or vegetables; complete or incomplete processed fruits or vegetables; or substrates derived from fruits and vegetables. Partial fruits and vegetables are those that are substantially whole, but perhaps damaged during development, harvesting, or other handling operation. Processed fruits and vegetables are those that have been mechanically treated, such as by squeezing, crushing, grinding, pureeing, macerating, juicing, or the like. A fruit- or vegetable-derived substrate could include seed, stems, skins, fiber or pomace resulting from one or more of the aforementioned processing techniques.

Specific sources of fruit or vegetable substrates contemplated herein include, but are not limited to, *Aronia* sp. such as chokeberry; *Beta* sp. such as beet; *Brassica* sp. such as red cabbage; *Citrus* sp. such as lemon, orange, and grapefruit; *Daucus* sp. such as black or purple carrot; *Empetrum* sp. such as crowberry; *Fragaria* sp. such as strawberry; *Hylocereus* sp. such as pitahaya; *Ipomoea* sp. such as sweet potato; *Malus* sp. such as apple; *Morus* sp. such as mulberry; *Prunus* sp. such as sweet and sour cherry, plum, and peach; *Punica* sp. such as pomegranate; *Pyrus* sp. such as pear; *Rhapanus* sp. such as raddish; *Ribes* sp. such as red currant, black currant and gooseberries; *Rubus* sp. such as blackberry, red raspberry, black raspberry and *Rubus* hybrids such as loganberry, boysenberry and tayberry; *Sambucus* sp. such as elderberry; *Solanum* sp. such as huckleberry and purple potato; *Vaccinium* species such as blueberry, cranberry, bilberry, cowberry (also known as lingonberry) and grape; and *Zea* sp. such as purple corn.

Target polyphenolic compounds for extraction from the aforementioned source materials principally include the flavonoids. Of particular interest are the anthocyanins, catechins, flavanones, flavanonols, flavones, flavonols and flavanols. Naturally-occurring flavonoids, except for the catechins, are glycosylated at positions C3, C7 and C4' (Harborne J. B., Ed. *The Flavonoids*; Chapman and Hall; London, U.K., 1994). The catechins found in food products tend not to be glycosylated, but are rather sometimes gallated. The aglycon forms of anthocyanins are technically referred to as "anthocyanidins". It is contemplated that all such forms of flavonoids could be extracted by the method of the invention. Specific examples of target polyphenolics are reported in Table 1, below.

The subcritical water extraction (SWE) process of the invention would, of course, use water at elevated temperatures and pressures (above ambient) as the principal solvent of an aqueous solvent system. It is preferred that the water is deoxygenated so as to prevent oxidation of the polyphenolic compounds during the extraction process. Minor amounts (up to about 45% v/v) of the aqueous-based solvent system could be a solvent approved for food grade use, such as ethanol, acetone, ethyl acetate or methylene chloride. The preferred cosolvent would be ethanol at a level up to 30% (v/v), or more preferably, up to 20% (v/v) of the total solvent system.

The extraction may be conducted in any system as known in the art, including a batch extractor, co-current continuous extractor, or countercurrent continuous extractor. The combination of temperature and pressure used for the SWE extraction would be within the indicated subcritical liquid zone illustrated in FIG. 1, especially in the area indicated by crosshatching. Extraction temperatures will typically be at least about 75° C. and less than about 200° C., preferably in the range of 100–150° C. However, the person of ordinary skill in the art would appreciate that these conditions may vary if a cosolvent is used. The objective of the temperature selection is to alter the dielectric constant of the water (78.3 at 25° C. and 55.7 at 100° C.) so that it is more similar to less polar solvents. By comparison, the dielectric constant of methanol is 32.6 at 25° C., and that of ethanol is 24.3 at 25° C. Pressures are selected to eliminate the boiling tendency of the solvent, and will typically be in the range of 10–50 atm (10–50 bar).

A desired effective dielectric constant can be attained by choice of solvent system as described above, or by adjusting the pH. The pH can be controlled by addition of mineral or organic acid, such as 0.01% HCl. For isolating the compounds contemplated by this invention, the pH will typically be within the range of 1–5. It would be within the skill of the person of ordinary skill in the art to select the most appropriate combination of solvent system, temperature, time, pressure, and pH for optimizing recovery of a desired polyphenolic compound or array of polyphenolic compounds from a given source material.

An important and unexpected aspect of the invention is that SWE can be applied to the extraction and isolation of anthocyanins and other polyphenolic compounds without substantial degradation thereof as a result of exposure to heat. For example, it is possible to preserve 25%, 50%, 75%, 90% or even 100% of the extracted polyphenolics in their native, chemically unaltered state. Accordingly, the solvent flow rate should be sufficiently rapid so as to minimize the target compound exposure time under elevated temperature conditions. This can be accomplished by maintaining a continuous flow of solvent through the extraction vessel at a moderate to rapid flow rate, and then rapidly cooling the water extracts upon exiting the extraction vessel. The rapid extraction of the polyphenolic compounds from the matrix is facilitated by the elevated pressure and temperature used, resulting in rapid mass transfer of the anthocyanins and consequently high extraction fluxes. Superficial velocity of the SWE in the extractor would be at least 0.1 cm/sec., and typically in the range of 0.1–0.5 cm/sec. The levels of bioactive components (e.g. anthocyanins) in the exiting extract can be monitored by the color intensity associated with the extract. Also, by monitoring the exit stream visually, the extraction rate of the anthocyanins can be optimized to terminate the extraction consistent with the disappearance of the anthocyanins in the exiting stream. It is envisioned that the SWE process would be effective and very rapid for recovering in excess of 90% of all targeted polyphenolic compounds. In the event that a certain amount of heat-, light-, or oxygen-induced chemical modification is permissible or desirable, it is possible to adjust the processing conditions accordingly.

The aforementioned SWE conditions are sufficient to sterilize both the substrate and also the extracted material. The SWE thereby serves as an in-situ sterilization process. If so desired, the SWE could be applied in tandem with a supercritical $CO_2$-based fluid extraction for total extractives processing of fruit or vegetable material.

Depending on the end-use application, individual compounds of interest could be isolated in substantially pure form from the cooled, polyphenolic compound-containing extracts recovered from the extractor. Conventional techniques, such as crystallization, membrane separation, or chromatography, including the use of a selective sorbent in-line could be used to further fractionate the polyphenolic compounds.

The following examples are intended to further illustrate the invention, without any intent for the invention to be limited to the specific embodiments described therein.

EXAMPLE 1

SWE Extraction of Anthocyanins from Dry Elderberry Stems

The extraction apparatus comprised a tubular extraction cell (46 ml) and a water heating coil enclosed within a temperature-controlled environment (oven). The apparatus was also equipped with a regulator for controlling the water pressure inside the extraction cell. Also a coil was provided for cooling the extract downstream from the extraction cell.

The sample was placed in the extraction cell and the oven was heated to a temperature of 120° C. Acidified water (0.01% HCl, pH ~2.3) was fed at a rate of 24 mL/min at a constant pressure of 40 Bar (580 psi). Pressure was selected at a level to prevent the possibility of steam formation within the extraction cell. Incremental samples were obtained every 60–80 grams of expelled solution and collected throughout a 40-minute interval. Color was monitored visually to an approximate equivalent of 20 ppm of cyanidin-3-glucoside (a specific anthocyanin). Color bodies are not extracted prior to pressurizing the water. Samples for HPLC analysis were prepared as described by Skrede et al. (*J. Food Sci.* 65(2): 357–364, 2000).

Extraction efficiency of the SWE process was comparable to results obtained using a 70% ethanolic extract. A control sample was extracted with 70% ethanol for 40 minutes with sonication and washed with excess ethanol to remove any remaining color from the substrate. All samples (extracts and sample washes) were immediately prepared for injection into HPLC as described above.

Results are summarized in Table 2. As indicated by solvent usage ratio, the volume of subcritical water needed to carry out a roughly equivalent extraction to that of ethanol is considerably less. When the SWE was completed (90% of anthocyanins recovered), the solvent usage efficiency far exceeded that obtained with an ethanolic extraction. Also, collection at 90% of the anthocyanin content was accomplished within the first 15 minutes of the extraction process using SWE.

The HPLC analytical methodology was altered to search alternative wavelength signatures for ellagic acid (260 nm and 370 nm) and quercetin (370 nm) in the extracts. The method for ellagic acid and quercetin detection, as presented by Rommel et al. [*J. Agric. Food Chem.* 41:1237–1241 (1993)], was adapted using the aforementioned HPLC analytical method. HPLC peaks corresponded to the ellagic standard's retention time and UV profile at 260 nm. Peaks were also found at 370 nm with a spectrum similar to that of quercetin as cited by Rommel et al. [*J. Agric. Food Chem.* 41(11):1951–1960 (1993)].

EXAMPLE 2

SWE Extraction of Anthocyanins from Dry Elderberry Seeds

Dry elderberry seeds were extracted using the same extraction apparatus and the same methodology as described in Example 1. A control sample was extracted with 70% ethanol and all analyses were conducted as described in Example 1. The results are reported in Table 2.

EXAMPLE 3

SWE Extraction of Anthocyanins from Dried Elderberries

Dried elderberries were extracted using the same extraction apparatus and the same methodology as described in Example 1. A control sample was extracted with 70% ethanol and all analyses were conducted as described in Example 1. The results are reported in Table 2.

EXAMPLE 4

SWE Extraction of Anthocyanins from Black Raspberry Pomace

Juiced black raspberry pomace was extracted using the same extraction apparatus and the same methodology as described in Example 1. A control sample was extracted with 70% ethanol and all analyses were conducted as described in Example 1. The results are reported in Table 2.

EXAMPLE 5

Time Course for SWE Extraction of Anthocyanins from Elderberry Fiber

Elderberry fiber was extracted using the same extraction apparatus and essentially the same methodology as described in Example 1. The temperature of the extraction cell was gradually raised from 28° C. to approximately 120° C. and the pressure was increased from atmospheric pressure to 20–48 bar. The color intensity of the exiting extract was visually monitored as a function of time. The initial sample taken at 27.5 minutes was dark in color. Five subsequent samples taken at 3.5–4 minute intervals were sequentially lighter in color. A final sample taken at 54 minutes during cooling of the extraction cell was noticeably light in color.

TABLE 1

| Polyphenolics Present in Common Berries Classification/compound | |
|---|---|
| Phenolic acids (hydroxybenzoic and hydroxycinnamic) | |
| Caffeic acid | Coumaric acid |
| Chlorogenic acid | Ferulic acid |
| Cinnamic acid | Gallic acid |
| Hydrolyzable tannins | |
| Ellagic acid | |
| Flavan-3-ols | |
| (+)-catechin | (−)-epicatechin |
| Stilbene | |
| Resveratrol | |
| Flavonols (aglycons and their glycosides) | |
| Kaempferol | Quercetin |
| Myricetin | |
| Anthocyanins (aglycones, their glycosides and their acylated glycosides) | |
| Cyanidin-3-glucoside | Peonidin-3-glucoside |
| Cyanidin-3-galactoside | Peonidin-3-galactoside |
| Cyanidin-3-arabinoside | Peonidin-3-arabinoside |
| Cyanidin-3-sambubioside | Petunidin-3-glucoside |
| Cyanidin-3,5-diglucoside | Petunidin-3-glacotside |
| Cyanidin-3-sambubioside-5-glucoside | Petunidin-3-arabinoside |
| Cyanidin-3-xyloside | Malvidin-3-glucoside |
| Delphinidin-3-glucoside | Malvidin-3-galacotside |
| Delphinidin-3-galactoside | Malvidin-3-arabinoside |
| Delphinidin-3-arabinoside | |

TABLE 2

Anthocyanin Extraction Yield Comparison for Four Berry Substrates

| Sample | Extraction | mg ANC/g substrate (as is basis) | mg ANC/g substrate (dry basis) | % ANC extracted (of ethanol) | µg ANC/g solvent | Solvent to Substrate Use Ratio |
|---|---|---|---|---|---|---|
| Elderberry Stems (dry) | Ethanol | 19.91 | 21.50 | 100.0 | 228 | 87:1 |
| | SWE | 19.26 | 20.08 | 93.4 | 272 | 71:1 |
| | +90% SWE* | 18.52 | 20.00 | 93.0 | 658 | 28:1 |
| Elderberry Seed (dry) | Ethanol | 4.76 | 5.25 | 100.0 | 142 | 33:1 |
| | SWE | 4.34 | 4.79 | 91.2 | 213 | 21:1 |
| | +90% SWE* | 4.17 | 4.60 | 87.6 | 1853 | 7:1 |
| Dried Elderberry | Ethanol | 3.81 | 4.13 | 100.0 | 110 | 34:1 |
| | SWE | 4.42 | 4.79 | 116.0 | 111 | 40:1 |
| | +90% SWE* | 4.08 | 4.42 | 107.0 | 277 | 15:1 |
| Black Raspberry Pomace (wet) | Ethanol | 4.79 | 13.70 | 100.0 | 141 | 35:1 |
| | SWE | 3.85 | 11.01 | 80.4 | 137 | 28:1 |
| | +90% SWE* | 3.50 | 10.01 | 73.1 | 237 | 15:1 |

*Reflects 90% of all anthocyanins extracted by the SWE process.

We claim:

1. A method for extracting an anthocyanin compound in its substantially native, chemically unaltered state from a fruit or vegetable material, wherein said fruit material is obtained from a source species selected from the group consisting of *Aronia, Citrus, Empetrum, Fragaria, Hylocereus, Malus, Morus, Prunus, Punica, Pyrus, Ribes, Rubus, Sambucus, Solanum* and blueberry species of *Vaccinium*, and said vegetable material is obtained from a source species selected from the group consisting of *Beta, Brassica, Daucus, Ipomoea, Rhapanus, Solanum*, and *Zea*, comprising:

a. treating said fruit or vegetable material with a continuous flow of aqueous solvent system through said material under subcritical conditions sufficient to dissolve said anthocyanin compound into the aqueous solvent system to obtain an aqueous solvent system having a dissolved anthocyanin compound, wherein said subcritical conditions comprise a temperature in a range of 75–200° C., an extraction pressure of 10–50 Bar, a pH less than 5.0, and a superficial velocity of at least 0.1 cm/sec;

b. rapidly cooling said aqueous solvent system having said dissolved anthocyanin compound; and c. recovering an extract comprising the aqueous solvent system and said dissolved anthocyanin compound in its native, chemically unaltered state.

2. The method of claim 1, wherein said fruit or vegetable material is selected from the group consisting of whole fruits or vegetables, partial fruits or vegetables, processed fruits or vegetables, and fruit- or vegetable-derived substrates.

3. The method of claim 2, wherein said fruit- or vegetable-derived substrate is selected from the group consisting of seeds, stems, skins, fiber and pomace.

4. The method of claim 1, wherein said material is a fruit material obtained from a source selected from the group consisting of elderberry, blueberry, bilberry, chokeberry, raspberry, blackberry, red currant, black currant, strawberry, mulberry, lingonberry, pear, apple, peach, plum, cherry, and pomegranate.

5. The method of claim 1, wherein said material is a fruit material obtained from a source selected from the group consisting of elderberry, chokeberry, blueberry, bilberry and raspberry.

6. The method of claim 1, wherein water is the principal component of the aqueous solvent system comprising water and a lesser amount of a cosolvent other than water.

7. The method of claim 6, wherein said cosolvent is ethanol.

8. The method of claim 6, wherein said cosolvent is present in said solvent system at a level of less than 45% (v/v).

9. The method of claim 6, wherein said cosolvent is present in said solvent system at a level of less than 30% (v/v).

10. The method of claim 6, wherein said cosolvent is present in said solvent system at a level of less than 20% (v/v).

11. The method of claim 1, wherein water is the sole component of the aqueous solvent system.

12. The method of claim 11, wherein said water is acidified.

13. The method of claim 1, wherein one of said subcritical conditions is a pH of less than 2.0.

14. The method of claim 1, wherein said subcritical conditions comprise a temperature in a range of 100–150° C. and a pH between 1 and less than 5.0.

15. A method for extracting an anthocyanin compound in its substantially native, chemically unaltered state from a fruit or vegetable material, wherein said fruit material is obtained from a source species selected from the group consisting of *Aronia, Citrus, Empetrum, Fragaria, Hylocereus, Malus, Morus, Prunus, Punica, Pyrus, Ribes, Rubus, Sambucus, Solanum* and blueberry species of *Vaccinium*, and said vegetable material is obtained from a source species selected from the group consisting of *Beta, Brassica, Daucus, Ipomoea, Rhapanus, Solanum*, and *Zea*, comprising:

b. treating said fruit or vegetable material with a continuous flow of solvent consisting essentially of water through said material under subcritical conditions sufficient to dissolve said compound into the solvent, wherein said subcritical conditions comprise a temperature in a range of 100–200° C., an extraction pressure of 10–50 Bar, a pH less than 5.0, and a superficial velocity of at least 0.1 cm/sec;

b. rapidly cooling said solvent having said dissolved compound; and c. recovering an extract comprising the solvent and said dissolved anthocyanin compound in its native, chemically unaltered state.

16. The method of claim 15, wherein said fruit or vegetable material is selected from the group consisting of whole fruits or vegetables, partial fruits or vegetables, processed fruits or vegetables, and fruit- or vegetable-derived substrates.

17. The method of claim 16, wherein said fruit- or vegetable-derived substrate is selected from the group consisting of seeds, stems, skins, fiber and pomace.

18. The method of claim 15, wherein said material is a fruit material obtained from a source selected from the group consisting of elderberry, blueberry, bilberry, chokeberry, raspberry, blackberry, red currant, black currant, strawberry, mulberry, lingonberry, pear, apple, peach, plum, cherry, and pomegranate.

19. The method of claim 15, wherein said material is a fruit material obtained from a source selected from the group consisting of elderberry, chokeberry, blueberry, bilberry and raspberry.

* * * * *